United States Patent [19]

Reddaway

[11] 4,270,170

[45] May 26, 1981

[54] ARRAY PROCESSOR

[75] Inventor: Stewart F. Reddaway, Baldock, England

[73] Assignee: International Computers Limited, London, England

[21] Appl. No.: 20,912

[22] Filed: Mar. 15, 1979

[30] Foreign Application Priority Data

May 3, 1978 [GB] United Kingdom ............... 17403/78

[51] Int. Cl.³ ............................................. G06F 15/16
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,287,702 | 11/1966 | Borck, Jr. et al. | 364/200 |
| 3,287,703 | 11/1966 | Slotnick | 364/200 |
| 3,296,426 | 1/1967 | Ball | 364/200 |
| 3,308,436 | 3/1967 | Borck, Jr. et al. | 364/200 |
| 3,312,943 | 4/1967 | McKindles et al. | 364/200 |
| 3,364,472 | 1/1968 | Sloper | 364/200 |
| 3,473,160 | 10/1969 | Wahlstrom | 364/900 |
| 3,537,074 | 10/1970 | Stokes et al. | 364/200 |
| 3,544,973 | 12/1970 | Borck, Jr. et al. | 364/200 |
| 3,582,899 | 6/1971 | Semmelhaack | 364/200 |
| 3,699,529 | 10/1972 | Beyers et al. | 364/200 |
| 3,735,365 | 5/1973 | Nakamura et al. | 364/200 |
| 3,815,095 | 6/1974 | Wester | 364/200 |
| 3,970,993 | 7/1976 | Finnila | 364/200 |
| 3,979,728 | 9/1976 | Reddaway | 364/200 |
| 4,065,808 | 12/1977 | Schomberg et al. | 364/200 |
| 4,099,233 | 7/1978 | Barbagelata et al. | 364/200 |
| 4,174,514 | 11/1979 | Sternberg | 364/200 |

Primary Examiner—James D. Thomas
Assistant Examiner—Eddie P. Chan
Attorney, Agent, or Firm—Hane, Roberts, Spiecens & Cohen

[57] ABSTRACT

An array processor consisting of integrated circuit chips connected in a rectangular array. The number of terminals on each chip necessary for these interconnections is reduced by arranging for certain terminals to be connected to branched paths, so that those terminals are shared between different connections. Special gating is provided to ensure that signals are routed correctly over these shared connections.

2 Claims, 8 Drawing Figures

ARRAY PROCESSOR

BACKGROUND TO THE INVENTION

This invention relates to array processors.

An array processor is defined herein as a data processing system comprising a plurality of processing elements which are operable in parallel upon separate data streams under the control of a common stream of control signals. Thus, all the elements perform basically the same sequence of operations (subject to possible modifications by activity bits within the individual elements or by control signals which are specific to particular groups of elements), but on different data. With such a processor, as many operations can be performed simultaneously as there are elements, and hence the data throughput can be very high.

In such a processor, the processing elements may be connected together by data paths which permit neighbouring elements to transfer data. For example, in a two-dimensional rectangular array, each element may be connected to its four nearest neighbours in the north, east, south and west directions.

Because of its repetitive structure, an array processor is particularly suitable for implementation by integrated circuit techniques. In particular, each processing element may be formed as a separate large scale integrated circuit (LSI) chip or, preferably, a sub-array of processing elements may be formed as a single LSI chip.

In integrated circuit technology, while the cost per gate is low, the cost per pin is relatively high. Therefore, it is desirable to keep the number of connections to each chip as small as possible.

One object of the present invention is to reduce the number of pins required on each chip for the purpose of routing data between neighbouring processing elements.

SUMMARY OF THE INVENTION

According to the invention, an array processor comprises a plurality of integrated circuit chips each chip containing at least one processing element, each element being connected by data paths to a plurality of neighbouring elements, wherein at least some of these paths are provided by branched paths connecting together at least three pins on different chips, and wherein for each such branched path at any given time only one of the elements connected to that path is allowed to send data on to that path and only one element is allowed to receive data from that path, in accordance with the value of a routing code which specifies the direction in which data is to be transferred between neighbouring elements. It can be seen that at least one of the pins connected to each branched path is, in effect, shared between two or more different data paths. Thus, the number of pins required is reduced.

BRIEF DESCRIPTION OF THE DRAWINGS

One array processor in accordance with the invention will now be described by way of example with reference to the accompanying drawings, of which.

DESCRIPTION OF PREFERRED EMBODIMENT

Figure 1:
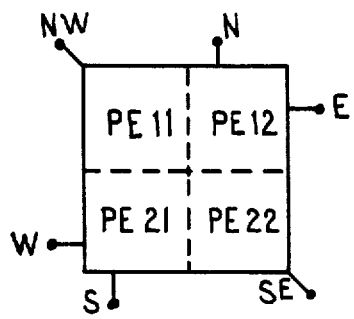
FIG. 1 shows an LSI chip implementing a sub-array of processing elements.

FIG. 1 shows an LSI chip which contains four processing elements PE11, PE12, PE21 and PE22, arranged in a 2×2 sub-array. In the completed array processor, each element is connected to its four nearest neighbours in the north, east, south and west directions. Connections between elements on the same chip (such as between PE11 and PE12) are of course formed by means of internal connections within the chip itself. However, connections to elements on other chips must be made by way of external pins on the chip.

At first sight, it would appear that eight pins are required for this purpose: two from each of the elements on the chip. However, in the embodiment described here, only six pins (designated N, E, SE, S, W and NW) are provided on each chip for this purpose. Thus, there is a reduction of two pins on each chip, which is a significant and worthwhile saving.

It will be appreciated, of course, that each chip will have several other pins in addition to those shown in FIG. 1, for power input, control codes and so on.

Figure 2:
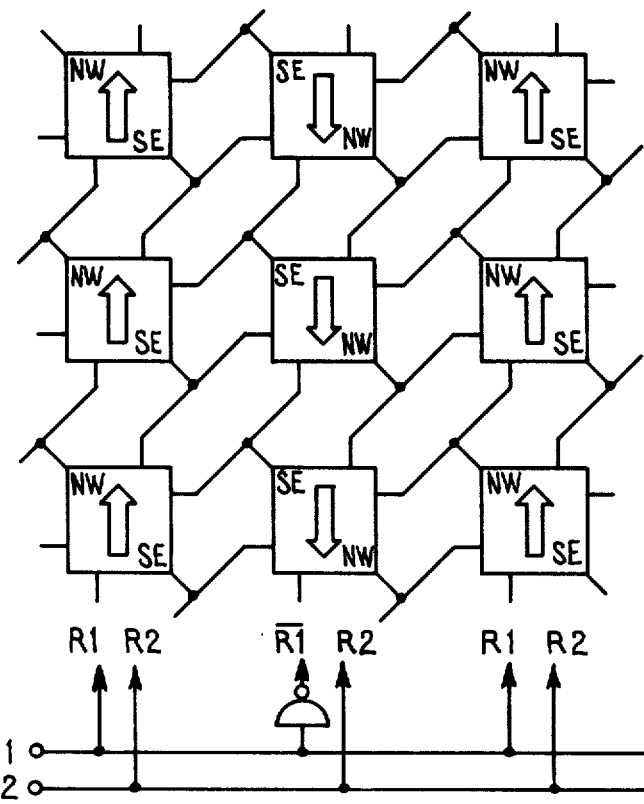
FIG. 2 shows the way in which the LSI chips are connected to form the array processor.

Referring to FIG. 2, a large number of chips such as shown in FIG. 1 are connected together in a two-dimensional rectangular array. All the chips are identical. However, as shown, the chips in alternate columns are rotated through 180° so that for the chips in the even-numbered columns the N pin actually points "south". The reason for this will be explained later. Each "diagonal" pin (NW or SE) is connected to the nearest non-diagonal pin on each of the two neighbouring chips nearest that diagonal pin. Thus, it can be seen that the connections to these diagonal pins have three branches.

FIG. 2 also shows the way in which a routing code is broadcast to all the chips. This code consists of two bits R1, R2 the meaning of which is as follows:

| R1 | R2 | Direction |
|----|----|-----------|
| 0  | 0  | North     |
| 0  | 1  | East      |
| 1  | 0  | South     |
| 1  | 1  | West      |

As shown in FIG. 2, the bit R1 is inverted for the even-numbered columns. This takes account of the fact that the chips in these columns are rotated by 180°.

Figure 3:
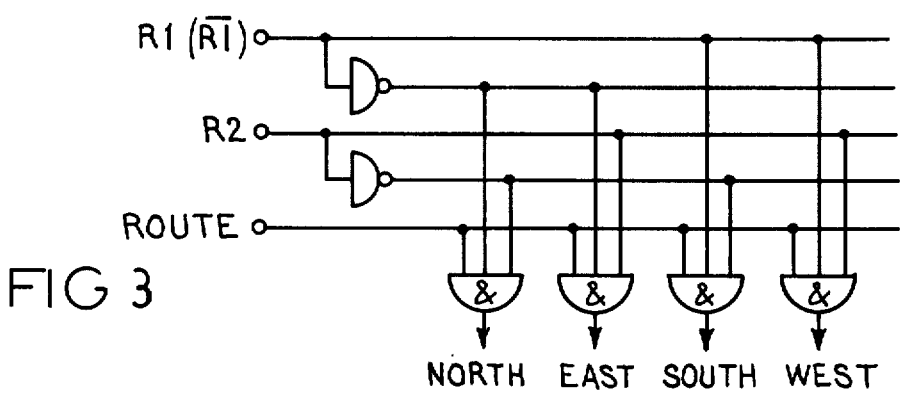
FIG. 3 shows a decoding circuit on each chip.

Referring to FIG. 3, this shows a decode circuit which is incorporated on each chip. This circuit decodes the routing code R1, R2 ($\overline{R1}$, R2 in the case of the even-numbered columns) to produce a binary "1" on the appropriate one of four control lines NORTH, EAST, SOUTH and WEST. The decoder also receives a control signal ROUTE. When ROUTE=1 the decoder is enabled, but when ROUTE=0 it is disabled and all four control lines are held at "0". FIGS. 4-7 show the four processing elements PE11-PE22 on the chip, and the gating which controls the connection between these elements and the pins N, E, SE, S, W and NW. (The internal structure of each processing element forms no part of the present invention, and it will not be described further in this specification. It may, however, be similar to that described in our British Pat. No. 1,445,714 published Aug. 11, 1976 or in our co-pending British Patent Application No. 10873/76 filed Mar. 18, 1976, now British Pat. No. 1,536,933 published Dec. 29, 1978). Each processing element has two outputs A and B. Output A produces data for routing to neighbouring elements, while output B produces data for forming row response signals which will be described later. (In some forms of the invention a single output may serve both these functions).

Figure 4:
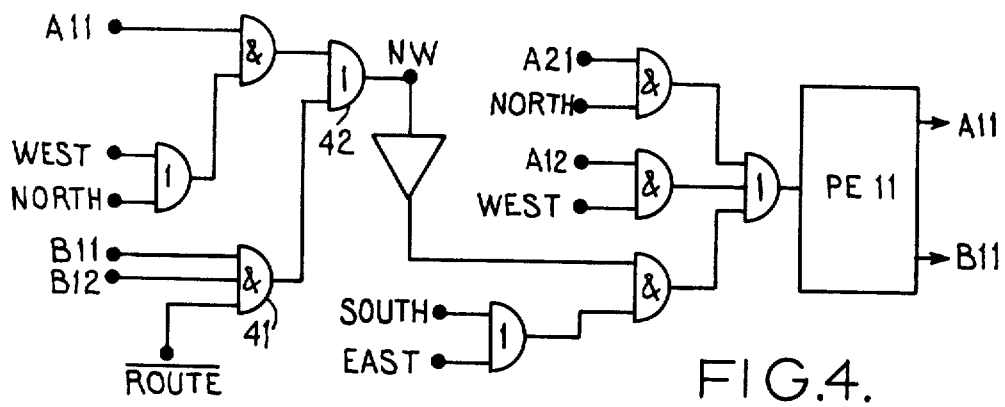
FIGS. 4-7 show various gating circuits on the chip.

Referring now to FIG. 4, the input to the processing element PE11 is selected from one of three sources.

(a) When NORTH=1, the output A21 from processing element PE21 is selected.

(b) When WEST=1, the output A12 from element PE12 is selected.

(c) When SOUTH=1 or EAST=1, the input from the NW pin is selected.

In addition, when WEST=1 or NORTH=1, the output A11 from the element PE11 is applied to the pin NW, for routing to the elements on neighbouring chips.

Figure 5:
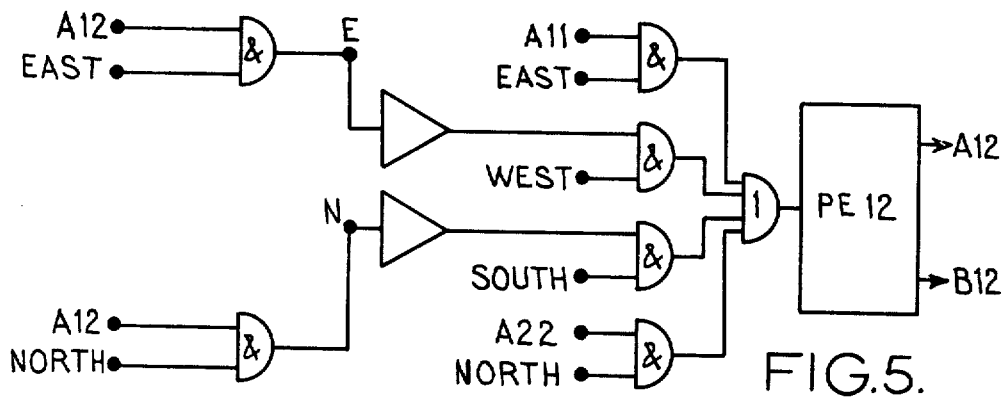
Figure 6:
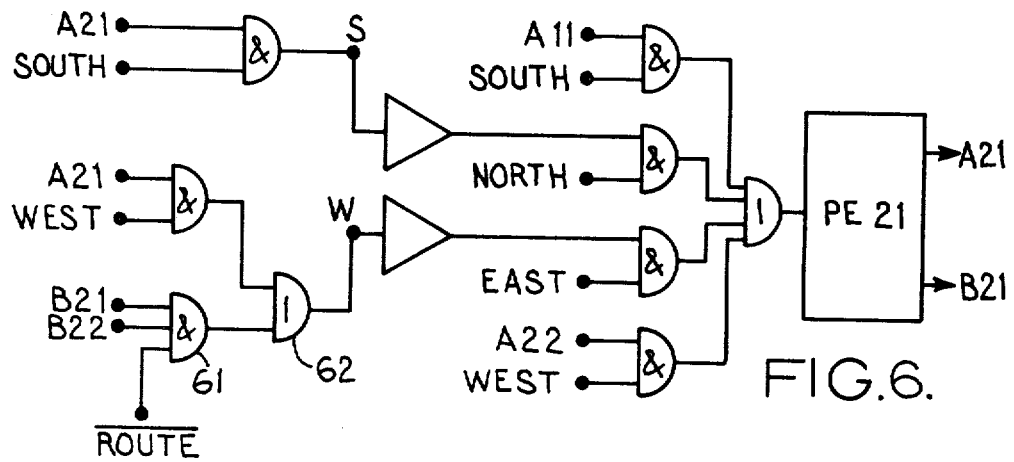
Figure 7:
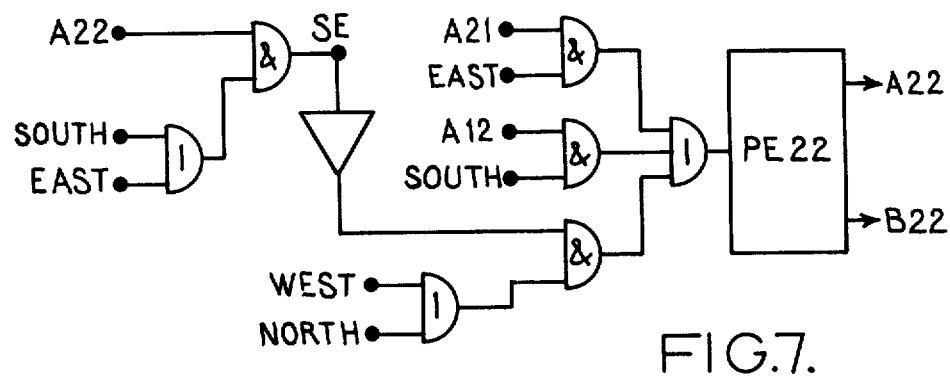

The gating circuits for the other elements PE12, PE21 and PE22 are shown in FIGS. 5–7 and are very similar to those shown in FIG. 4. It is therefore not necessary to describe these Figures in detail. It can be seen that the circuits shown in FIGS. 4–7 ensure that data is routed in the correct direction between neighbouring processing elements, according to the value of the direction code. For example, if the direction code R1, R2 is (0,0) the output A of each element will be routed to the input of its northern neighbour. It can also be seen that for each three-branched connection, at any given time, only one branch is allowed to send data, and only one is allowed to receive data, the third branch being disabled and hence unable to send or receive.

Instead of routing data between adjacent elements, it may be desired to produce a set of row response signals, one for each row. Each such response signal consists of the AND function of the outputs B from all the processing elements in the row in question. This mode of operation is selected by setting ROUTE=0. Referring to FIG. 4, when ROUTE=0, an AND gate 41 is enabled, permitting the AND function of the outputs B11 and B12 from processing elements PE11 and PE12 to be applied by way of OR gate 42 to the NW pin. Similarly, as shown in FIG. 6, when ROUTE=0, an AND gate 61 is enabled, permitting the AND functions of the outputs B21 and B22 to be applied by way of OR gate 62 to the W pin. Thus, the AND function of the outputs of the two elements PE11 and PE12 in the upper row of the $2 \times 2$ sub-array appears on the NW pin, while the AND function of the outputs of the two elements PE21, PE22 in the lower row of the sub-array appears on the W pin.

Figure 8:
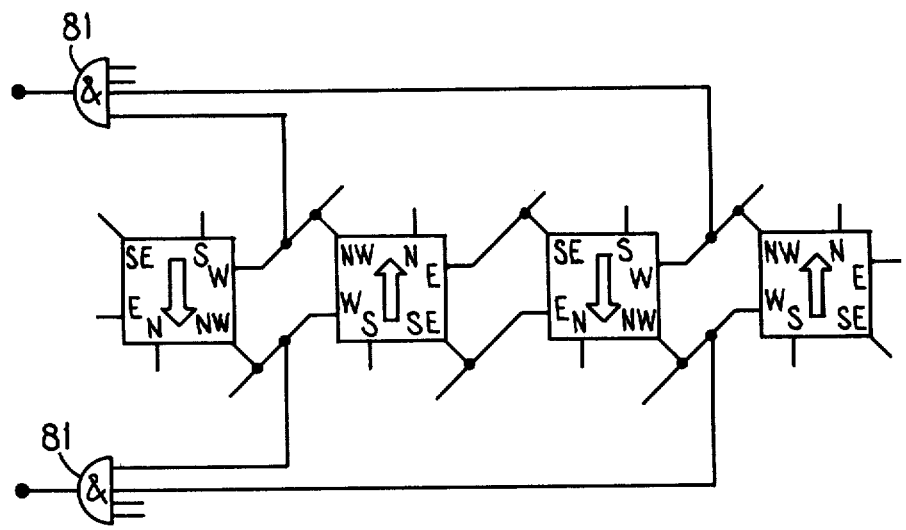
FIG. 8 shows the way in which row response signals are derived from the array.

Referring now to FIG. 8, this shows one row of chips, and the way in which their row response signals are formed. It can be seen that, because the chips in alternate columns are rotated through 180°, the response pins NW and W of elements in adjacent rows are already connected together by means of the data paths which are used for routing data between elements. The signal which appears on each such path is the wired AND function of the output of the two response pins to which it is connected, and is thus the AND function of the B outputs from four processing elements. (The outputs from the circuits are assumed to be of the "open collector" type, so as to make such wired logic possible.) As shown in this figure, these AND functions from each row are all combined together in AND circuits 81, one for each row, so as to produce the row response signals as required.

The reason for the 180° rotation of the chips in alternate rows can now be appreciated: this feature permits the AND combination of four elements in a row to be formed without any extra wiring external to the chip, and thus reduces the number of inputs to the AND circuits 81. It is found that the reduction in complexity in the AND circuits more than compensates for the additional inverters (FIG. 2) which are necessitated by the 180° rotation.

The feature described in the last paragraph forms the subject of a co-pending British Patent Application No. 17404/78 filed May 3, 1978, now British Pat. No. 2,020,458 published Nov. 14, 1979.

What is claimed is:

1. An array processor comprising a plurality of integrated circuit chips arranged in rows and columns in a two-dimensional rectangular array, each chip containing a two-dimensional sub-array of processing elements arranged in rows and columns, and each chip having a plurality of diagonal and non-diagonal connection pins, the processing elements along each edge of the sub-array of at least one of the chips being connected by way of said connection pins to the elements along the edge of the sub-array of a neighboring chip, the processing elements in each corner of the sub-array thus having two such connections to two different nearest neighboring chips, wherein the two connections to the element in one corner of the sub-array share a single one of said diagonal pins which is connected to the nearest non-diagonal pin on each of the two neighboring chips nearest that diagonal pin, and similarly the two connections to the element in the diagonally opposite corner of the sub-array share another single one of said diagonal pins which is connected to the nearest non-diagonal pin on each of the two neighboring chips nearest that diagonal pin.

2. A processor according to claim 1 wherein each chip comprises means for receiving a routing code specifying a direction in which data is to be transferred between the elements, a first set of gating means controlled by the received routing code, for coupling data from the processing elements at the edges of the sub-array to the respective connection pins, and a second set of gating means also controlled by the received routing code, for coupling data from the connection pins to the respective processing elements on the edges of the sub-array.

* * * * *